United States Patent
Wada

(10) Patent No.: US 7,828,659 B2
(45) Date of Patent: Nov. 9, 2010

(54) GAME DEVICE, CONTROL METHOD OF COMPUTER, AND INFORMATION STORAGE MEDIUM

(75) Inventor: Yoshiko Wada, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 914 days.

(21) Appl. No.: 11/632,550

(22) PCT Filed: Jul. 4, 2005

(86) PCT No.: PCT/JP2005/012339
§ 371 (c)(1),
(2), (4) Date: Jan. 17, 2007

(87) PCT Pub. No.: WO2006/008950
PCT Pub. Date: Jan. 26, 2006

(65) Prior Publication Data
US 2007/0254739 A1    Nov. 1, 2007

(30) Foreign Application Priority Data
Jul. 20, 2004   (JP) .............................. 2004-212248

(51) Int. Cl.
*A63F 9/24* (2006.01)
*A63F 13/00* (2006.01)
*G09G 5/00* (2006.01)
*G06F 3/033* (2006.01)

(52) U.S. Cl. ................................ 463/36; 463/9; 463/30; 463/31; 463/37; 345/156; 345/157

(58) Field of Classification Search ................. 463/7–9, 463/30–31, 33, 36–37; 348/734; 345/156–158, 345/173, 178; 382/106, 312
See application file for complete search history.

(56) References Cited

U.S. PATENT DOCUMENTS

| 5,803,810 A | 9/1998 | Norton et al. |
| 6,498,628 B2 * | 12/2002 | Iwamura ..................... 348/734 |
| 7,597,622 B2 * | 10/2009 | Takase ........................ 463/33 |
| 2002/0041327 A1 | 4/2002 | Hildreth et al. |

FOREIGN PATENT DOCUMENTS

| EP | 1 279 425 A | 1/2003 |
| JP | 2003-80484 A | 3/2003 |
| JP | 2003-85571 A | 3/2003 |
| JP | 2003-135851 A | 5/2003 |
| WO | WO 96/30856 A | 10/1996 |

* cited by examiner

*Primary Examiner*—Peter DungBa Vo
*Assistant Examiner*—Jasson H Yoo
(74) *Attorney, Agent, or Firm*—Sughrue Mion, PLLC

(57) ABSTRACT

A game device capable of ensuring player's action to be displayed in a judgment area set in a player image is provided. A game device (10) including a player image acquisition unit (60) for sequentially acquiring a player image representing the player, a game processing unit (72) for controlling a game based on an amount of action of the player displayed in the judgment area set in the player image further includes an action range image production unit (62) for producing an action range image representing an action range of the player based on the player image sequentially acquired by the player image acquisition unit (60), and a judgment area setting unit (68) for setting the judgment area in accordance with the content of the action range image produced by the action range image production unit (62).

13 Claims, 9 Drawing Sheets

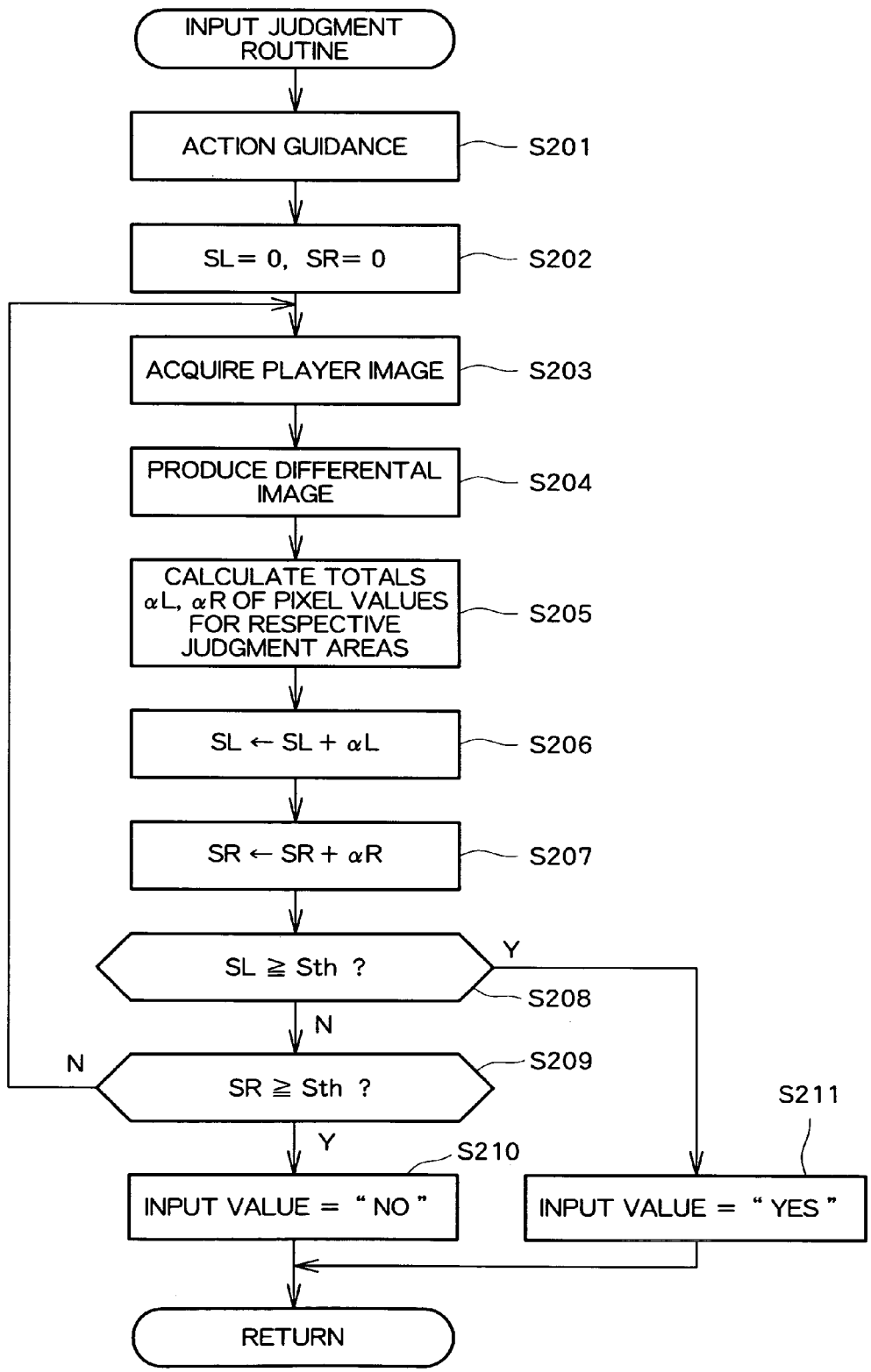

GAME DEVICE, CONTROL METHOD OF COMPUTER, AND INFORMATION STORAGE MEDIUM

TECHNICAL FIELD

The present invention relates to a game device, a control method of a computer, and an information storage medium, and more particularly to a game using a player image captured by image capturing means, such as an electronic camera.

BACKGROUND ART

In recent years, systems for capturing a moving image of a player with an electronic camera, and using the moving image to determine the progress of a game have been attracting attention.

In a system disclosed in Patent Document 1 (Japanese Patent Laid-Open Publication No. 2003-135851), for example, an image of a player (hereinafter referred to as a "player image") is captured at a predetermined time interval with a camera unit, and the amount of action of the player is sequentially calculated based on a differential image between the latest player image and the immediately preceding player image. The amounts of action of the player sequentially calculated are accumulated to obtain a total amount of action of the player and control the progress of the game based on whether or not the total amount exceeds a predetermined threshold within a predetermined time period. The above Patent Document 1 also discloses a structure for setting a judgment area at a predetermined site of a player image to calculate the total amount of action of a player in such a judgment area to be used for determining how to proceed with the game.

Such a system makes it possible to implement a game that allows a player to input their intention for operation without any special operation device, so that anybody can enjoy the game with ease. Patent Document 1: Japanese Patent Laid-Open Publication No. 2003-135851.

DISCLOSURE OF INVENTION

Problems to be Solved by the Invention

However, body dimensions such as height, arm length, and the like vary between individuals, and the distance between a camera unit and a player varies with how the system is arranged. Therefore, it may be difficult to display the motion of the player in the judgment area set at a predetermined site of the player image.

Means for Solving the Problem

The present invention has been made in view of the above-described problems, and aims to provide a game device, a method of controlling a computer, and an information storage medium, capable of ensuring player's action to be shown within a judgment area set in a player image.

In order to solve the above-described problems, the present invention according to one aspect provides a game device including player image acquisition means for sequentially acquiring a player image representing a player, and game control means for controlling a game based on an amount of action of the player shown in a judgment area set in the player image, wherein the game device further includes action range image production means for producing an action range image representing an action range of the player based on the player image sequentially acquired by the player image acquisition means, and judgment area setting means for setting the judgment area in accordance with the content of the action range image produced by the action range image production means.

A method of controlling a computer (the term "computer" hereinafter includes a home-use game machine, an arcade game machine, a portable game device, a personal computer, a server computer, a mobile phone, a personal digital assistant, and the like) according to another aspect of the present invention is a method of controlling a computer connected to player image acquisition means for sequentially acquiring a player image representing a player, including producing an action range image representing an action range of the player based on the player image sequentially acquired by the player image acquisition means, setting a judgment area in the player image in accordance with the content of the produced action range image, and controlling a game based on an amount of action of the player shown in the judgment area set in the player image.

The present invention according to a still another aspect provides a program to cause a computer to function as player image acquisition means for sequentially acquiring a player image representing a player, game control means for controlling a game based on an amount of action of the player shown in a judgment area set in the player image, action range image production means for producing an action range image representing an action range of the player based on the player image sequentially acquired by the player image acquisition means, and judgment area setting means for setting the judgment area in accordance with the content of the action range image produced by the action range image production means. This program may be stored in a variety of computer readable information storage media, such as a CD-ROM, a DVD-ROM, a ROM cartridge, and a memory card.

According to the present invention, an action range image representing an action range of a player is produced, and in accordance with the content thereof the position of a judgment area of the player image is determined. As a result, the judgment area can be set at a position corresponding to the action range of the player, thereby ensuring that player's action can be shown inside the judgment area.

According to one embodiment of the present invention, the judgment area setting means sets the judgment area so that at least part of the judgment area overlaps the action range of the player represented by the action range image, thereby ensuring that the player's action can be shown inside the judgment area.

The judgment area setting means may set the judgment area on a predetermined line between a predetermined initial position of the player image and a predetermined standard point. The judgment area setting means may further include standard point position determination means for determining a position of the standard point based on the action range image. Further, the action range image may be produced based on a differential image of the player images sequentially acquired by the player image acquisition means.

BRIEF DESCRIPTION OF THE DRAWINGS

FIG. 14 is a flowchart showing an input judgment process in the game device according to the embodiment of the present invention.

BEST MODE FOR CARRYING OUT THE INVENTION

An exemplary embodiment of the present invention will now be described with reference to the accompanying drawings.

Figure 1:
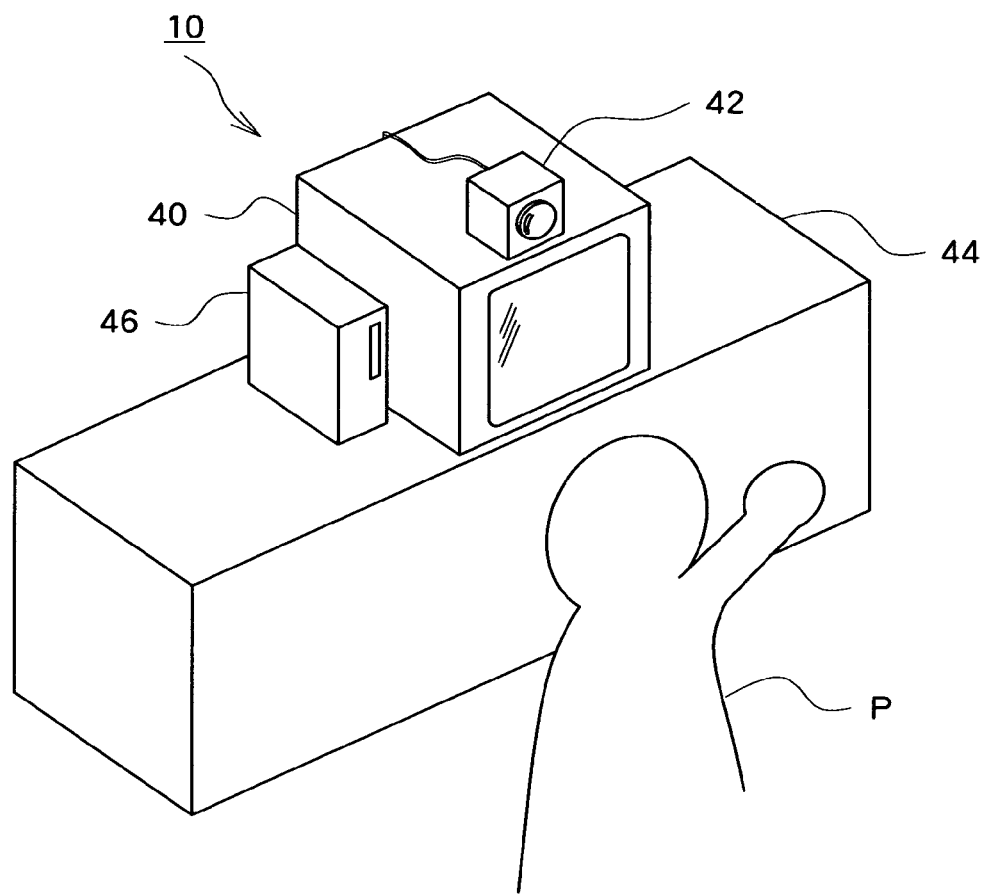
FIG. 1 is a perspective view showing a situation where a game device according to an embodiment of the present invention is played.

FIG. 1 is a perspective view for expressing a situation where a player plays a game using a game device according to an embodiment of the present invention. As shown, a game device 10, which includes a home-use TV receiver 40, a camera unit 42, and a home-use game machine 46, is used for implementing various games, such as a quiz game. The home-use TV receiver 40 and the home-use game machine 46 are mounted on a cabinet 44, while the camera unit 42 is on the home-use TV receiver 40. The camera unit 42 is a digital camera for presenting an image of a player P in real time, and is connected to the home-use game machine 46 via a cable for supplying the image of the player P (player image) captured at a predetermined time interval to the game machine 46 in real time (sequentially at a predetermined time interval). The home-use game machine 46 is connected to the home-use TV receiver 40, so that game screen images produced by the game machine 46 are displayed while providing game music, game effect sound, and a voice message from a speaker incorporated therein.

Figure 2A:
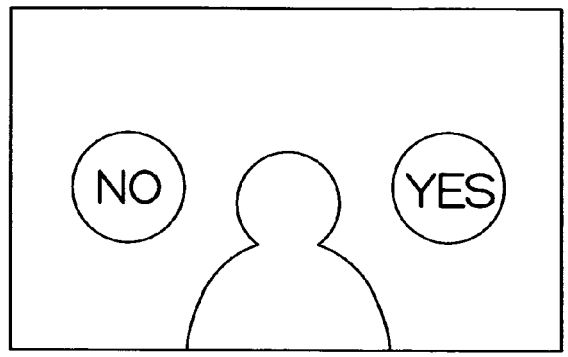
FIGS. 2(a) and 2(b) are views showing an example of a game screen.
Figure 2B:
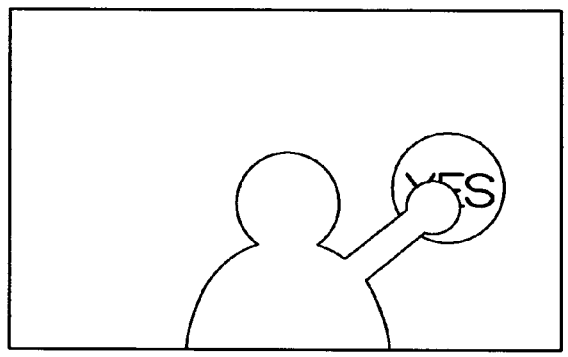
Figure 3A:
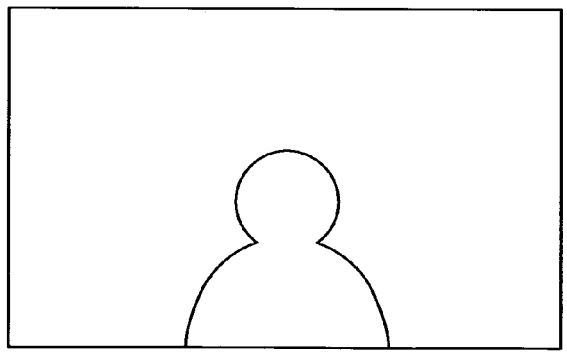
FIGS. 3(a) and 3(b) are views showing a method of producing a game screen.

This game device 10 is designed to calculate an amount of action when the player P moves their hand and the like in front of the camera unit 42 and determine progress of the game depending on whether or not the player moves more than a predetermined amount. For example, when a quiz game is implemented with the game device 10, a game screen formed by combining two choice images of a circular shape with "YES" and "NO" messages with a player image is displayed by the home-use TV receiver 40, as shown in FIG. 2(a). The choice images are disposed above the shoulders of the player P. This game screen is produced by combining the player image P input from the camera unit 42 shown in FIG. 3(a) and a background image representing two choice images shown in FIG. 3(b) in an overlapping manner. The images are both produced at the same size. After this screen is displayed, a question and action guidance are provided to the player P as a voice message from the home-use TV receiver 40 or a text message displayed near the bottom of the game screen of FIG. 2(a) saying, for example, "Mt. Fuji is the fifth highest mountain in the world. If you think this is correct, wave your hand in front of the message 'YES' . If not, wave your hand in front of the message 'NO'." In accordance with this guidance, the player P moves their hand so that an image of the hand overlaps the choice image representing "YES" or "NO", and moves their hand at that position, whereby the home-use game machine 46 makes a judgment of "YES" or "NO". FIG. 2(b) shows the player P putting the image of their hand over the choice image for "YES". In accordance with the judgment of "YES" or "NO", the home-use game machine 46 informs the player P whether the input content, i.e. the answer, is correct or not, and updates the game result of the player P. The game result and the message saying whether answer is correct or not are displayed by the home-use TV receiver 40 or output as a voice message from the built-in speaker.

Figure 3B:
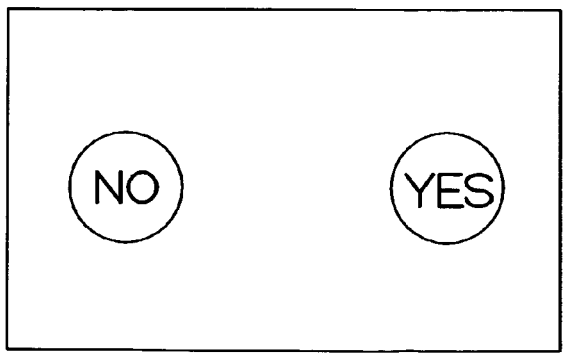
Figure 4:
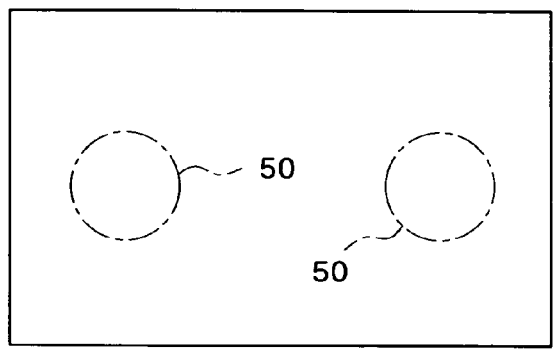
FIG. 4 is a view showing a judgment area used for game processing.

Judgment area specification data for specifying an area where each choice image is displayed on the background image shown in FIG. 3(b) is stored in the home-use game machine 46. FIG. 4 shows a judgment area 50 specified by the judgment area specification data. By determining whether or not motion is detected in the player image within the area specified by the judgment area specification data, whether or not the choice corresponding to the determination area 50 is selected can be determined. The motion of the player image can be determined by the difference in player images.

Figure 5A:
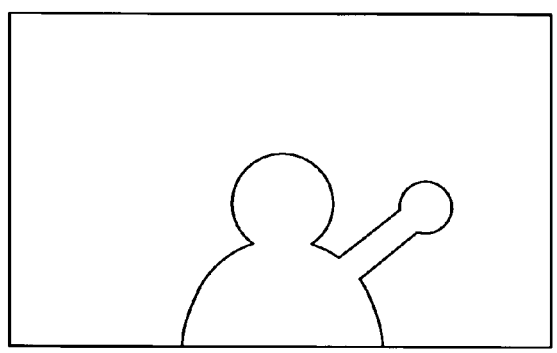
FIGS. 5(a)-(c) are views showing a method of producing a differential image.
Figure 5B:
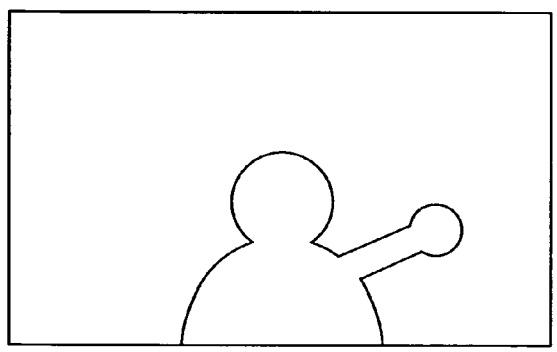
Figure 5C:
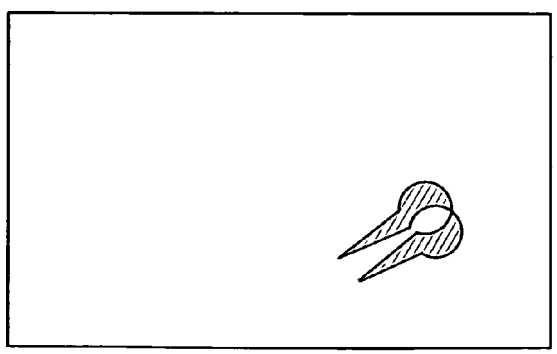

FIGS. 5(a)-(c) show an example of player images consecutively captured by the camera unit 42 and a differential image produced by the home-use game machine 46; FIG. 5(a) shows the latest image, FIG. 5(b) shows the immediately preceding image, and FIG. 5(c) shows a differential image between the latest image and the immediately preceding image. The example shown therein represents the situation where the player P raises their left hand upward in front of the camera unit 42. The differential image in FIG. 5(c) is the same size as the images of FIG. 5(a) and FIG. 5(b), and the absolute value of the difference between pixel values (color information) assigned to the corresponding pixels (pixels at the same address) of these player images is assigned as the pixel value of that pixel. Therefore, the pixel value of the pixel constituting an area where the displayed contents are the same between the latest image and the immediately preceding image, i.e. an area with no movement, has a value zero, while the pixel value of the pixel constituting an area where the displayed contents are changed from the immediately preceding player image to the latest player image, i.e. an area where the displayed contents are different, is equal to or greater than 1.

Figure 6:
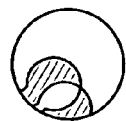
FIG. 6 is a view showing an image acquired by extracting the judgment area from the differential image.

This game device 10 produces a differential image between the latest image and the immediately preceding image at a predetermined interval (such as 1/60 second), and paying attention only to each judgment area as shown in FIG. 6, adds up the pixel values of the pixels in each judgment area to calculate the amount of player's action within each judgment area. If the accumulated value of the player's action amounts (the total amount of action of the player) exceeds a predetermined threshold in a predetermined time period, it is determined that the player has input their intention (such as "YES") corresponding to that area. The game proceeds in accordance with the determination.

Figure 7A:
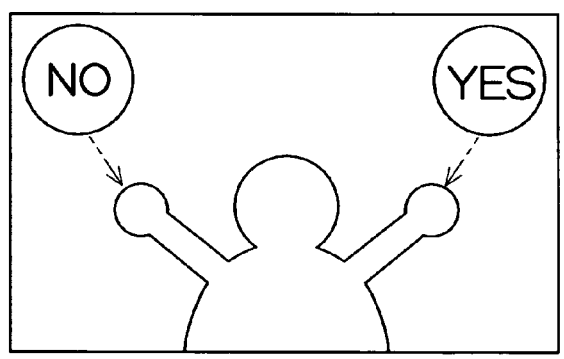
FIGS. 7(a) and 7(b) are views showing how choice images (judgment areas) move.
Figure 7B:
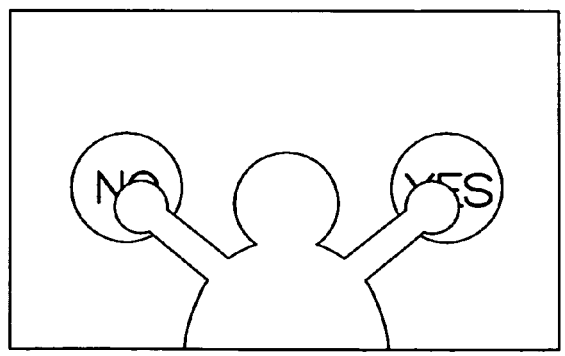

According to the present embodiment, each choice image displayed on the background image moves in accordance with the position of the player P represented by the player image. More specifically, if, for example, the player P is short or is away from the camera unit 42, or the shooting direction of the camera unit 42 is set above the head of the player P, the portion where the body of the player P is displayed becomes farther away from each choice image on the game screen, as shown in FIG. 7(a). As a result, it is hard for the player P to place their hand over the choice images even though they raise both hands to reach them. In view of such a case, an action range of the player P is detected beforehand, so that each choice image and the judgment area corresponding thereto are moved to be located within the action range of the player P according to the present embodiment. Thus, as illustrated in FIG. 7(b), the player P can easily place the image of their hand over each choice image.

Figure 8:
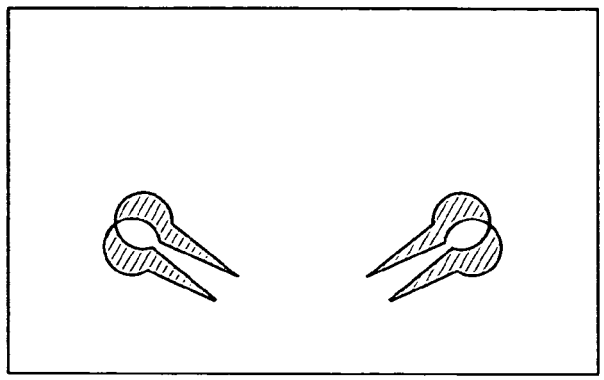
FIG. 8 is a view showing a method of producing an action range image.
Figure 9:
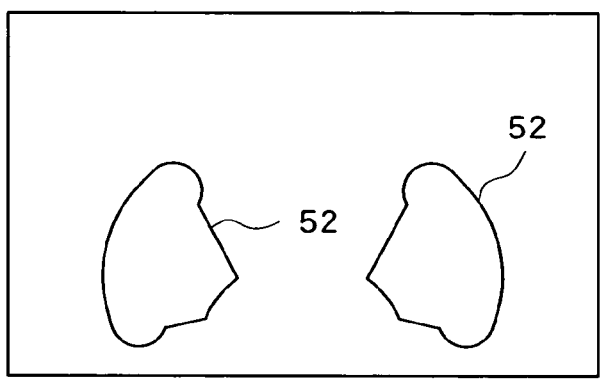
FIG. 9 is a view showing the action range image.

More specifically, when a player image is captured before the game starts, differential images from the immediately preceding player images are produced and stored in storage means as illustrated in FIG. 8. A plurality of differential images are thus obtained at different timings. The differential images are binarized and logically added to produce action range images shown in FIG. 9. That is, each differential image is binarized to produce a binarized differential image. If one or more pixel values of the corresponding images of each binarized differential image have a value of 1, the pixel value of that pixel is assigned 1. If all the pixel values are 0, the pixel value of that pixel is assigned zero. As a result, an action range image 52 shown in FIG. 9 is obtained. The manner in which the action range image is produced is not limited to the above-described process, and can naturally be obtained by a variety of processes.

Figure 10:
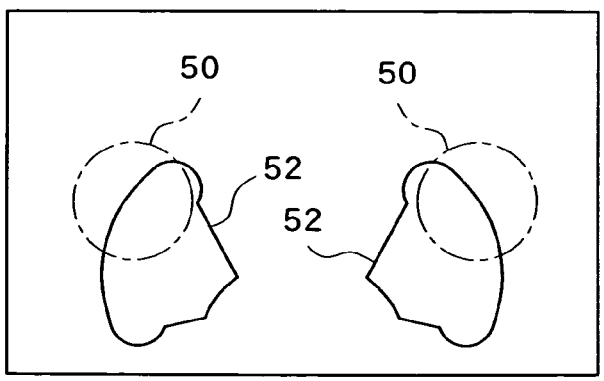
FIG. 10 is a view showing a method of setting the judgment area.

According to the present embodiment, after the action range image is thus obtained, the judgment area is set in accordance with the contents of the image. More specifically, each initial position of the choice area and judgment area is acquired (such as upper right corner or upper left corner of the game screen), and the judgment area is moved by a predetermined distance toward a standard position preset at a position lower than the center of the screen. If the action range image (the portion having the pixel value of 1) shown in the moved judgment area does not reach a predetermined proportion, the judgment area is further moved in the same direction by a predetermined distance. Thus, the area is moved so that a predetermined proportion or more of the action range image 52 is shown in the judgment area 50 as illustrated in FIG. 10. At this step, the choice image is preferably moved on the game screen in accordance with the gradual movement of the judgment area.

A hardware configuration of the game device 10 will now be described.

Figure 11:
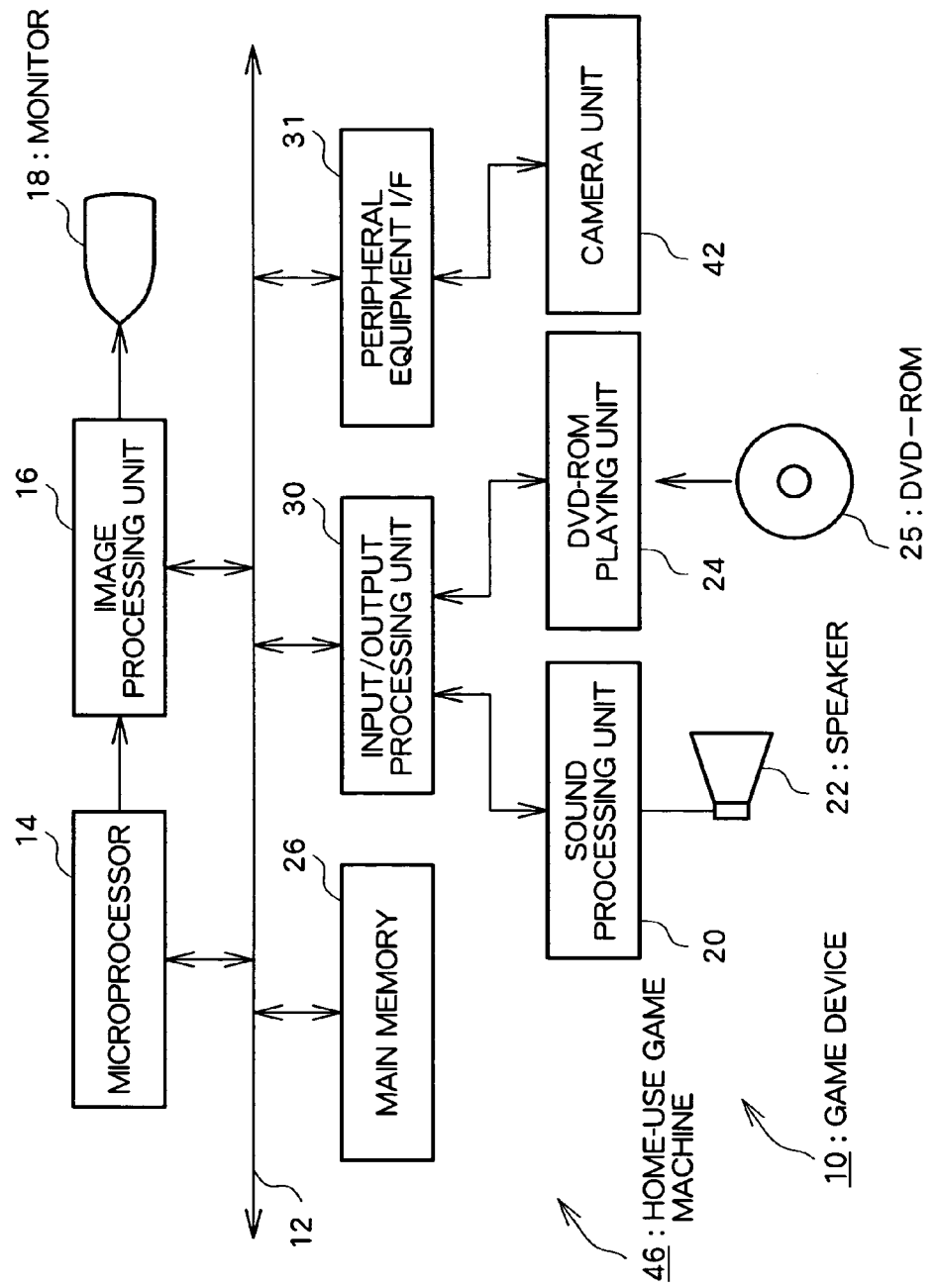
FIG. 11 is a view showing a hardware configuration of the game device according to the embodiment of the present invention.

FIG. 11 illustrates a hardware configuration of the game device 10. As illustrated, the game device 10 is formed by a DVD (digital versatile disk)-ROM 25, which is an information storage medium, placed in the home-use game machine 46 connected to a monitor 18 and a speaker 22. While the DVD-ROM 25 is used for supplying a game program and game data to the home-use game machine 46 in this embodiment, any other information storage media readable by computers, such as CD-ROMs (compact disk-read only memory) and ROM (read only memory) cards, may be used instead. The game program and the game data can be remotely supplied to the home-use game machine 46 through a data network such as Internet.

The home-use game machine 46 includes a microprocessor 14, an image processing unit 16, a main memory 26, an input/output processing unit 30, a peripheral equipment interface 31, a sound processing unit 20, and a DVD-ROM playing unit 24. The microprocessor 14, the image processing unit 16, the main memory 26, the input/output processing unit 30, the peripheral equipment interface 31 are mutually connected via a bus 12 for data exchange, with the input/output processing unit 30 being further connected to the sound processing unit 20, and the DVD-ROM playing unit 24. The peripheral equipment interface 31 is connected to the camera unit 42. The respective elements of the home-use game machine 46 are all accommodated in a housing. In this embodiment, the home TV receiver 40 is used as the monitor 18, and a speaker incorporated therein is used as the speaker 22.

The microprocessor 14 controls the respective elements of the home-use game machine 46 based on an operating system stored in an unillustrated ROM and the game program read from the DVD-ROM 25. The bus 12 is used for exchanging addresses and data among the respective elements of the home-use game machine 46. The main memory 26 is used for storing the game program and game data read from the DVD-ROM 25 as required. The image processing unit 16, which includes a VRAM (video random access memory), receives image data from the microprocessor 14, and draws a game screen image in the VRAM. The image processing unit 16, moreover, converts the content of the VRAM into a video signal provided to the monitor 18.

The input/output processing unit 30 is an interface for allowing the microprocessor 14 to access the sound processing unit 20 and the DVD-ROM playing unit 24. The sound processing unit 20 includes a sound buffer, and reproduces data, such as game music, game effect sound, and voice messages read by the DVD-ROM 25 and stored in the sound buffer, and outputs the data from the speaker 22. The DVD-ROM playing unit 24 reads the game program and game data recorded in the DVD-ROM 25 in accordance with an instruction from the microprocessor 14. The peripheral equipment interface 31 is an interface for connecting a variety of peripheral devices to the home-use game machine 46, and can be formed by a USB (universal serial bus) interface or the like. In this embodiment, the camera unit 42 is connected to the peripheral equipment interface 31. The camera unit 42 is, for example, a well-known digital camera for supplying to the home-use game machine 46 a captured image (player image in this example) in black and white, gray scale, or color at predetermined time intervals (such as 1/60 second). In order to capture the image of the player P, the camera unit 42 is mounted on the home-use TV receiver 40 with its lens facing the player P in this embodiment.

A process performed by the game device 10 will next be described.

Figure 12:
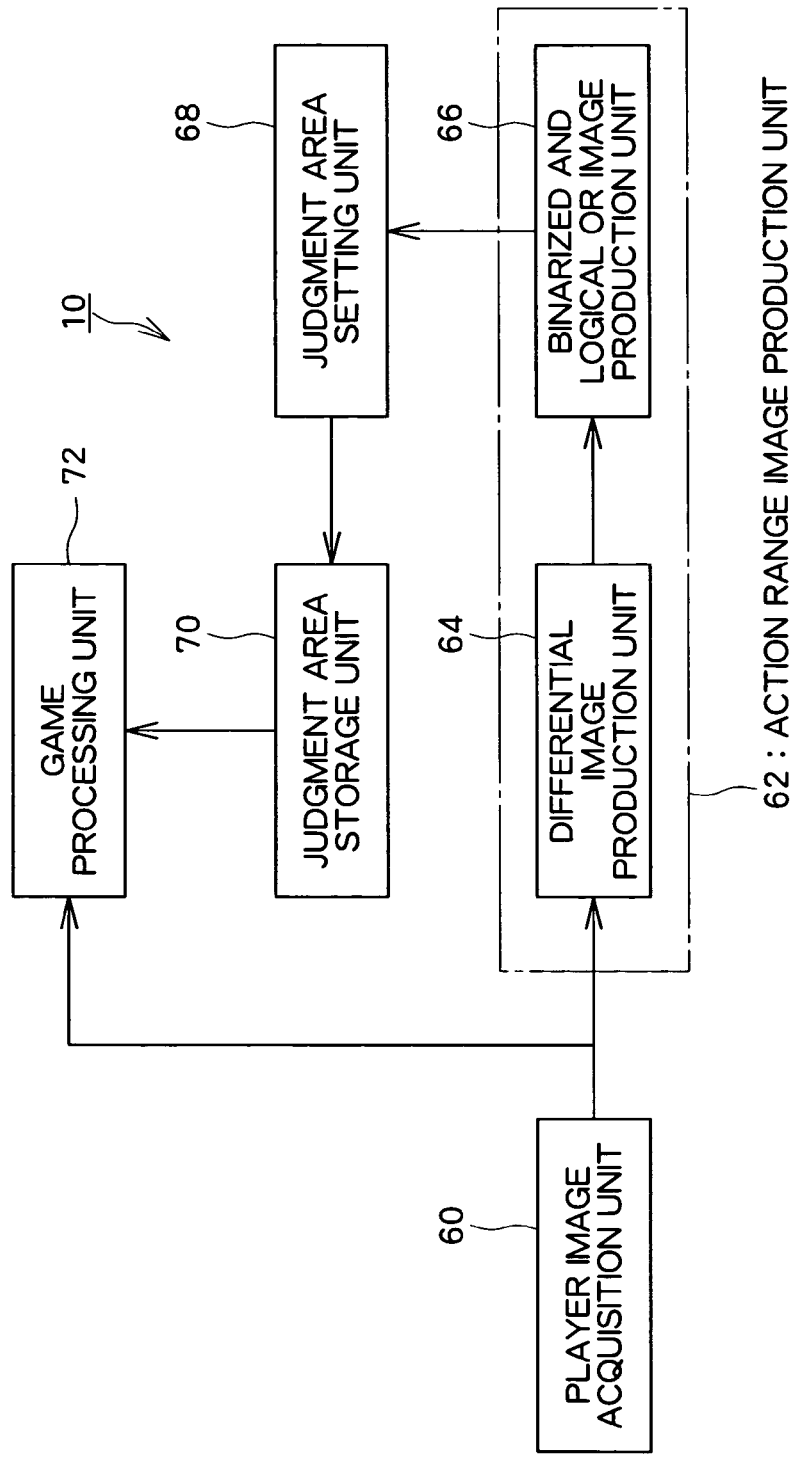
FIG. 12 is a functional block diagram of the game device according to the embodiment of the present invention.

FIG. 12 is a functional block diagram showing a game device 10. The game device 10 functionally includes a player image acquisition unit 60, an action range image production unit 62, a judgment area setting unit 68, a judgment area storage unit 70, and a game processing unit 72. These elements can be implemented by executing a predetermined game program stored in the DVD-ROM 25 in the home-use game machine 46.

The player image acquisition unit 60 sequentially acquires player images captured by the camera unit 42. The action range image production unit 62 produces an action range image representing an action range of a player P based on the player images sequentially acquired by the player image acquisition unit. More specifically, the action range image production unit 62 includes a differential image production unit 64 and a binarized and logical OR image production unit 66. The differential image production unit 64 uses the player images sequentially acquired by the player image acquisition unit 60 to produce a differential image between the player image acquired at each timing and the player image acquired at the immediately preceding timing. The resulting differential image is supplied to the binarized and logical OR image production unit 66, which binarizes each differential image and calculates the logical OR to produce an action range image. The resulting action range image is supplied to the judgment area setting unit 68.

The judgment area setting unit 68 sets each judgment area based on the contents of the action range image produced by the action range image production unit 62. More specifically, the judgment area setting unit 68 sets each judgment area so that the action range of the player P represented by the action range image at least partially overlaps each judgment area. Also, the judgment area setting unit 68 sets each judgment area so that it is positioned on a line connecting a predetermined initial position (such as the upper right corner or upper left corner) of the player image and a predetermined standard point (located, for example, slightly lower than the center). At this step, a position at which the action range of the player P occupies a predetermined proportion or more of each judgment area is searched while gradually moving each judgment area from the initial position toward the standard point. Further, if each judgment area moves, each choice image is moved accordingly on the game screen, so that the player P recognizes the gradual movement of the judgment area. The judgment area setting unit 68 may determine the position of the standard point based on the action range image so as to further ensure that the action range of the player P is located inside the judgment area.

The judgment area (to be more precise, the position of each judgment area in the player image) set by the judgment area setting unit 68 is stored in the judgment area storage unit 70. The game processing unit 72 controls a game, such as the above-described quiz game, based on the action amount of the player P represented in the judgment area set in the player image based on the player images sequentially acquired by the player image acquisition unit 60.

Figure 13:
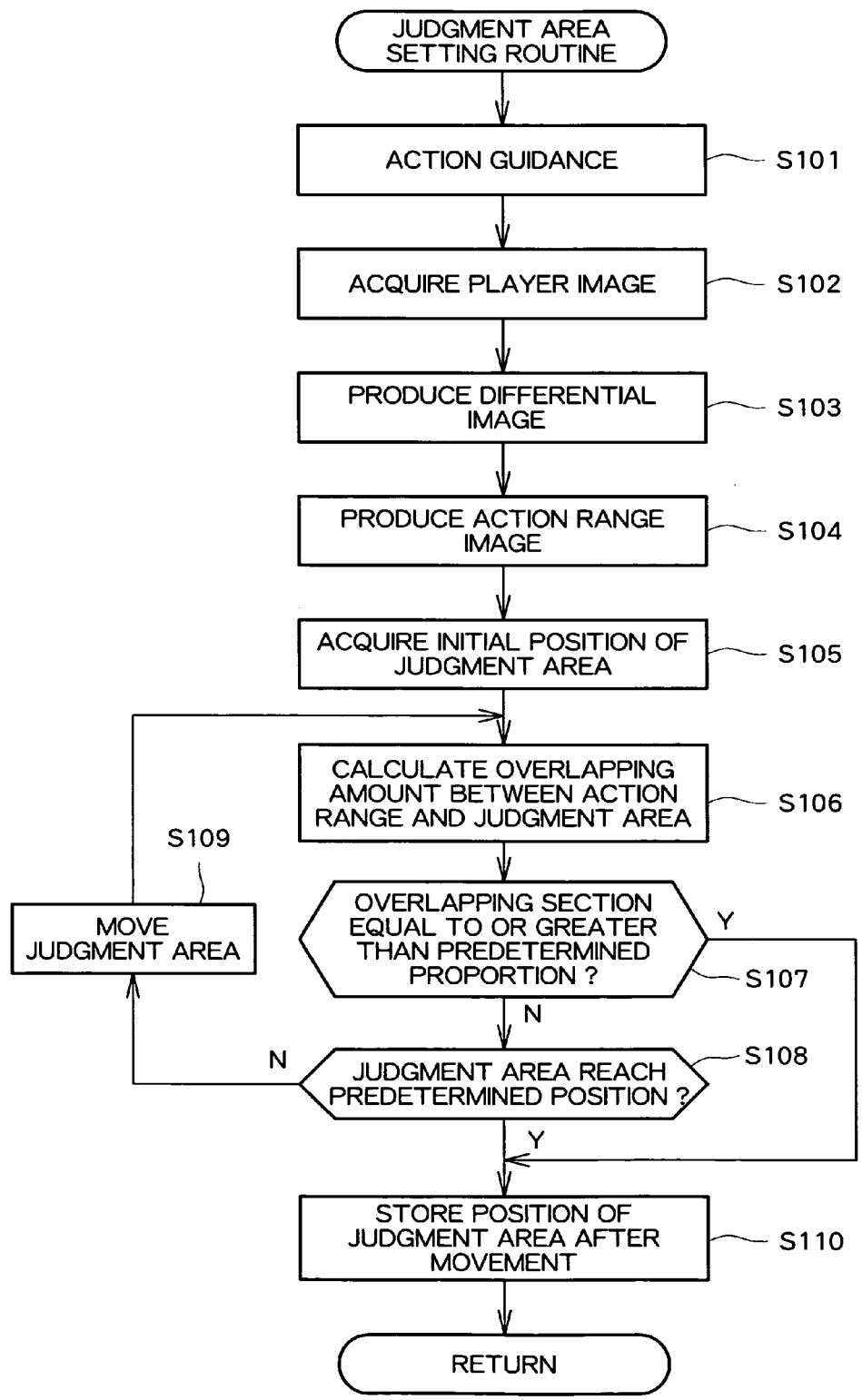
FIG. 13 is a flowchart showing a judgment area setting process in the game device according to the embodiment of the present invention.

FIG. 13 is a flow chart showing a judgment area setting process in the game device 10. This flow chart shows a process implemented by executing the game program stored in the DVD-ROM 25 with the home-use game machine 46. This process begins with providing guidance on the game screen by the game processing unit 72 to prompt the player P to give a big wave (S101) The player image acquisition unit 60 then acquires a player image (S102), and supplies the image to the differential image production unit 64. The differential image production unit 64 produces a differential image between each acquired player image and the immediately preceding player image (S103). The binarized and logical OR image production unit 66 binarizes the differential image, and calculates a logical OR of the binarized differential image, thereby producing an action range image representing an action range of the player P (S104).

Next, the judgment area setting unit 68 acquires an initial position for each judgment area (S105). If, for example, an initial position is set for each judgment area and such information is stored in the DVD-ROM 25, the initial position for each judgment area can be easily acquired by reading the information from the disk. Next, the proportion of the action range of the player P included in each judgment area is calculated (S106). Determination is then made as to whether or not a section overlapping the action range of the player P exceeds a predetermined proportion for all judgment areas (S107), and, if it is equal to or greater than the predetermined proportion for all judgment areas, the current position is stored as the position of the judgment area in the judgment area storage unit 70 (S110). On the other hand, if any of the judgment areas has an overlapping area smaller than the predetermined proportion, determination is made as to whether or not any determination area reaches a predetermined position (such as a standard position or a predetermined position short of the standard position) (S108) If any of the judgment areas reaches the predetermined position, that position is stored as the position of the judgment area in the judgment area storage unit 70 (S110). If none of the judgment areas reaches the predetermined position, each judgment area is moved toward the standard position by a predetermined distance (S109), and the process is repeated from the step S106.

Through the above-described process, each judgment area can be set so that the action range of the player P is shown at a predetermined proportion or more inside the area.

FIG. 14 is a flowchart showing an input judgment process in the game device 10. The flowchart of this figure shows a process implemented by the home-use game machine 46 executing a game program stored in the DVD-ROM 25, and mainly performed by the game processing unit 72. This process begins with displaying a message on the monitor 18 to provide the player P with action guidance (S201). This message includes displaying a quiz question and informing the player P how to act in front of the camera unit 42 to answer the question, such as "Mt. Fuji is the fifth highest mountain in the world. Wave your hand in front of 'YES' if you think this is correct, or in front of 'NO' if you don't".

As a next step, storage areas for a total amount SL of player' s action corresponding to one choice image and a total amount SR of player' s action corresponding to the other choice image are secured, and the value "zero" is assigned to initial values for these amounts (S202). The latest image of the player P captured by the camera unit 42 is acquired (S203), and a differential image between this image and the player P's image captured by the camera unit 42 immediately preceding thereto is produced (S204). If there is no immediately preceding image of the player P captured, i.e. when the step S203 is executed for the first time, production of a differential image is canceled.

Thereafter, among the pixel values assigned to the pixels forming the differential image, those assigned to the pixels located within each judgment area are added to calculate a player's action amount $\alpha L$ and a player's action amount $\alpha R$ (S205).

By adding the player's action amount $\alpha L$ to the total amount SL of the player's action, the total amount SL is updated (S206). Similarly, the player's action amount $\alpha R$ is added to the total amount SR of the player's action to update the total amount SR (S207). Note that the player's action amount $\alpha L$ is the value corresponding to the amount of action of the player P shown in one judgment area of the image captured by the camera unit 42, and the total amount SL of action of the player is a value corresponding to the total amount of action in the judgment area of interest after the action guidance is provided (S201). Similarly, the player's action amount $\alpha R$ is the value corresponding to the amount of action of the player P shown in the other judgment area of the image captured by the camera unit 42, and the total amount SR of action of the player is a value corresponding to the total amount of action in the judgment area of interest after the action guidance is provided (S201).

If the total amount SL of the player's action is no smaller than a predetermined threshold Sth (S208), it is determined that a particular intention, such as "YES", is input in response to the action guidance provided at the step S201 (S211), and the flow returns to the main game processing. In the main game processing, judgment is made, for example, as to whether or not the content input by the player P is correct, and the game result is calculated in accordance with the judgment. If the total amount SL of player's action is smaller than the predetermined threshold Sth, determination is next made as to whether or not the total amount SR of player's action is equal to or exceeds the predetermined threshold Sth (S209). If the total amount SR is no smaller than the predetermined threshold Sth, it is determined that another intention, such as "NO", is input in response to the action guidance provided at the step S201 (S210), and the flow returns to the main game processing. In the main game processing, judgment is made as to whether or not the content input by the player P is correct, and the game result is calculated in accordance with the judgment. On the other hand, if the total amount SR of player's action is also smaller than the predetermined threshold Sth, the flow returns to the step S203, and an image of the player P is reacquired. Through the above-described process, the amount of action of the player P displayed in each judgment area after the action guidance is provided (S201) is calculated, and when one of the amounts is equal to or greater than a predetermined threshold, it is determined that their intention is input in response thereto.

According to the present embodiment described above, a player P is provided with guidance of a predetermined action before starting a game, and when the player P performs an action in accordance with the guidance, an action range image representing the range is produced, followed by setting of a judgment area based on the contents thereof. As a result, it is ensured that the player's action is displayed in the judgment area set in the player image after the game is started.

It should be noted that the present invention is not limited to the above-described embodiment. For example, the type of game is not limited to the quiz game described above, and the present invention is applicable to other kinds of games. Further, the judgment area may be disposed directly in the action range of the player P rather than gradually moving the judgment area from the initial position to make judgment of the position thereof. Also, when the judgment area is gradually moved, the area may be moved along various curved lines rather than a straight line leading to the standard position.

The invention claimed is:

1. A game device, comprising:
   player image acquisition means for sequentially acquiring a player image representing a player;
   display means for displaying a game screen produced by combining the player image acquired by the player image acquisition means and a plurality of choice images; and
   game control means for controlling a game based on an amount of action of the player shown in a judgment area, which is an area where a choice image among the plurality of choice images is displayed;
   wherein the game device further comprises
   action range image production means for producing an action range image representing an action range of the player based on the player image sequentially acquired by the player image acquisition means, and
   judgment area setting means for setting the location of the judgment area in the game screen,
   wherein judgment area setting means moves the location of the judgment area in accordance with the content of the action range image produced by the action range image production means,
   wherein action range image production means:
   calculates a difference between a first player image and a second player image captured before the game starts;
   generates a differential image based on the calculated difference; and
   binarizes the differential image to produce the action range.

2. The game device according to claim 1, wherein
   the judgment area setting means moves the location of the judgment area so that at least part of the judgment area overlaps the action range of the player represented by the action range image.

3. The game device according to claim 2, wherein
   the judgment area setting means sets the judgment area at a position, wherein the position is between an initial position of the judgment area and a predetermined standard point.

4. The game device according to claim 2, wherein a section of the judgment area overlapping the action range of the player exceeds a threshold proportion.

5. The game device according to claim 3, wherein
   the judgment area setting means further includes standard point position determination means for determining a position of the standard point based on the action range image.

6. The game device according to claim 1, wherein
   the judgment area setting means sets the judgment area along a line, wherein the line connects an initial position of the judgment area to a predetermined standard point.

7. The game device according to claim 6, wherein
   the judgment area setting means further includes standard point position determination means for determining a position of the standard point based on the action range image.

8. The game device according to claim 6, wherein the judgment area setting unit acquires the initial position for the judgment area from a storage.

9. The game device according to claim 1, wherein
   the action range image is produced based on a differential image of the player images sequentially acquired by the player image acquisition means.

10. The game device according to claim 1, wherein the action range represents the maximum extent the player image displayed on the displaying means reaches, when the game screen produced by combining the player image acquired by the player image acquisition means.

11. The game device according to claim 1, wherein before starting of the game, plurality of differential images obtained at different times, and wherein the plurality of differential images are binarized and logically added to produce action range images.

12. A method of controlling a computer connected to player image acquisition means for sequentially acquiring a player image representing a player, comprising:
   producing an action range image representing an action range of the player based on the player image sequentially acquired by the player image acquisition means;
   setting a location of a judgment area in the player image in accordance with the content of the produced action range image; and
   controlling a game based on an amount of action of the player shown in the judgment area set in the player image,
   wherein the judgment area is an area where a choice image among a plurality of choice images is displayed; and
   wherein the setting the location of the judgment area is in accordance with the content of the action range image,
   wherein the producing the action range image comprises:
   calculating a difference between a first player image and a second player image captured before the game starts;

generating a differential image based on the calculated difference; and binarizing the differential image to produce the action range.

13. A non-transitory information storage medium readable by a computer and storing a program to cause the computer to function as:

player image acquisition means for sequentially acquiring a player image representing a player;

game control means for controlling a game based on an amount of action of the player shown in a judgment area set in the player image, wherein the judgment area is an area where a choice image among a plurality of choice images is displayed;

action range image production means for producing an action range image representing an action range of the player based on the player image sequentially acquired by the player image acquisition means; and judgment area setting means for setting a location of the judgment area, wherein judgment area setting means moves the location of the judgment area in accordance with the content of the action range image produced by the action range image production means.

* * * * *